No. 608,718. Patented Aug. 9, 1898.
P. C. SACHSE.
RUBBER TIRE.
(Application filed Apr. 8, 1898.)
(No Model.)
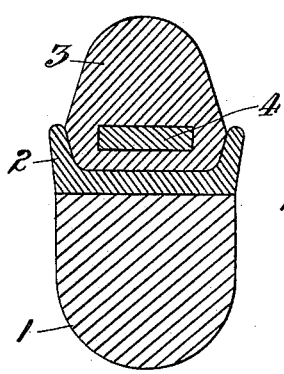
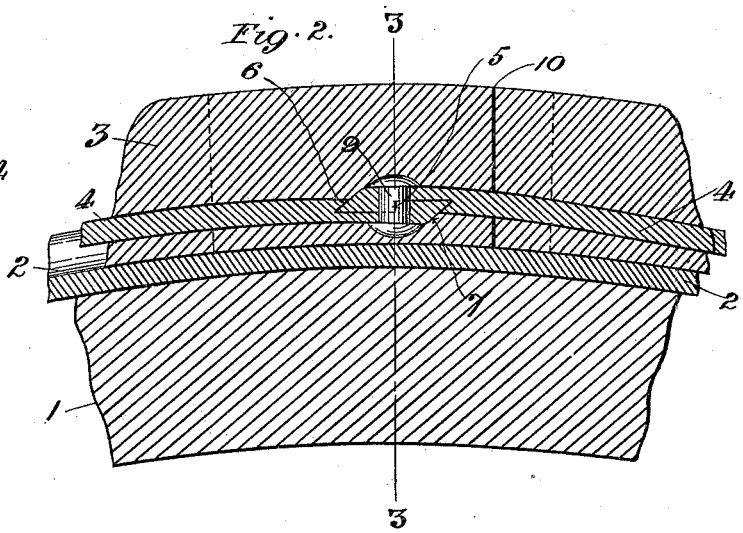
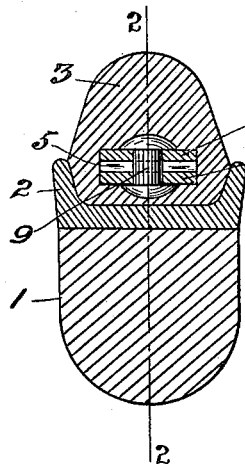
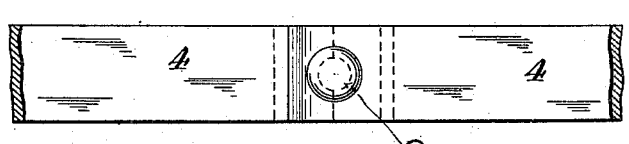
WITNESSES
Edward W. Furrell
Seloh W. Leary
INVENTOR
Paul C. Sachse
by
Emil Staren
attorney

UNITED STATES PATENT OFFICE.

PAUL C. SACHSE, OF ST. LOUIS, MISSOURI, ASSIGNOR TO T. W. BOOTH, OF SAME PLACE.

RUBBER TIRE.

SPECIFICATION forming part of Letters Patent No. 608,718, dated August 9, 1898.

Application filed April 8, 1898. Serial No. 676,888. (No model.)

*To all whom it may concern:*

Be it known that I, PAUL C. SACHSE, a citizen of the United States, residing at St. Louis, State of Missouri, have invented certain new and useful Improvements in Rubber Tires, of which the following is a full, clear, and exact description, reference being had to the accompanying drawings, forming a part hereof.

My invention has relation to improvements in rubber tires; and it consists in the novel construction and combination of parts more fully set forth in the specification and pointed out in the claims.

In the drawings, Figure 1 is a cross-section of the tire and wheel-rim on which the same is supported. Fig. 2 is a middle longitudinal section on line 2 2 of Fig. 3. Fig. 3 is a section on line 3 3 of Fig. 2, taken along a plane passing through the outer engaging shoulders of the notched ends of the overlapping portions of the inner band or core; and Fig. 4 is a plan of the overlapping ends of the core with the tire removed.

The object of my invention is to construct a rubber tire which can be readily and permanently secured along the outer peripheral groove of the rim of the wheel which carries the same.

A further object is to construct a simple and inexpensive mechanism which shall retain the tire in place.

In detail the invention may be described as follows:

Referring to the drawings, 1 represents the rim of the wheel, said rim being embraced by a grooved or channel bar 2, which snugly receives the base of the tire 3. The latter is composed of a simple band of rubber, molded to a proper cross-section and provided with a longitudinal opening through which is slipped a metallic band or ribbon 4, constituting the core of the tire. The free ends of the band are notched along their adjacent overlapping surfaces, the notch extending across the full width of the band and being bounded exteriorly by a shoulder 5, substantially in the line of the radius of the wheel, and interiorly by a wall 6, inclined to the shoulder 5 and conforming to the tapering end 7 of the opposite overlapping end of the band. After the band has been passed through the opening of the tire the notched ends are overlapped and interlocked, as best seen in Fig. 2, the inclined walls 6 preventing the free ends of the band bearing against them from springing out of their confines, this tendency to thus spring outward being exerted substantially at right angles to the inclined surface of the wall against which the end 7 of the band bears. Formed in the free ends of the band and cut partially from the body of the band exteriorly to the shoulder 5 and partially interiorly thereof are holes for the reception of the shank of a rivet 9, which in practice is inserted through the inner lap of the band upwardly when the upper lap is snapped or passed over the upper end of the shank, after which the projecting portion of the shank is tripped or hammered, spreading the metal, and thus forming the outer rivet-head for the shank. The object of the rivet is to reinforce the engaging shoulders 5, which under great tension might be liable to be stripped.

During the riveting operation the free and adjacent ends of the rubber tire are stripped back on each side of the overlapping juncture of the ends of the band to a position substantially indicated by dotted lines, Fig. 2, after which the ends are brought together, the rubber readily yielding and slipping over the overlapping ends of the band. The abutting ends of the tire are then united by a layer of cement 10, making practically a metallic band completely surrounded by an endless rubber casing. In mounting a set of tires care should be taken to select the right length for a given periphery of wheel in order to insure, when the ends of the steel band are brought together, that such band snugly embraces the rim. Any suitable clamping device by which the ends of the band may be seized and drawn together may be employed for the purpose.

It is apparent that minor changes might be made in my device without departing from the spirit of my invention, and although I have here illustrated but a single band it is apparent that two or more might be used, each embedded in a corresponding opening in the tire.

Having described my invention, what I claim is—

1. A rubber tire having a core inclosed within it, the adjacent surfaces of the free ends of the core having cut therefrom suitable notches by means of which the ends of the core may interlock, the exterior of each notch being limited by a shoulder substantially in line with the radius of the wheel, and the interior by a wall inclined to said shoulder, the free edge of each overlapping end of the core being tapered to conform to the inclination of the inner limiting-wall of the notch, the free ends of the tire being adapted to freely ride over such tapering edges, substantially as set forth.

2. A rubber tire having a core inclosed within it, the adjacent surfaces of the free ends of the core having cut therefrom suitable notches by means of which the ends of the core may interlock, the exterior of each notch being limited by a shoulder substantially in line with the radius of the wheel, and the interior by a wall inclined to said shoulder, the free edge of each overlapping end of the core bearing against the inclined wall of the notch of the adjacent end, and a rivet for additionally securing the overlapping ends together, substantially as set forth.

In testimony whereof I affix my signature in presence of two witnesses.

PAUL C. SACHSE.

Witnesses:
  EMIL STAREK,
  IELAH W. CAREY.